A. E. FINCH.
PULLEY.
APPLICATION FILED AUG. 16, 1915.

1,245,448.

Patented Nov. 6, 1917.

WITNESSES:
Walter H. Kelley
Clara Bowers

INVENTOR
Albert E. Finch
BY J. Wm. Ellis
ATTORNEY.

UNITED STATES PATENT OFFICE.

ALBERT E. FINCH, OF BUFFALO, NEW YORK.

PULLEY.

1,245,448.  Specification of Letters Patent.  Patented Nov. 6, 1917.

Application filed August 16, 1915. Serial No. 45,647.

*To all whom it may concern:*

Be it known that I, ALBERT E. FINCH, a citizen of the United States of America, residing in the city of Buffalo, county of Erie, and State of New York, have invented certain new and useful Improvements in Pulleys, of which the following is a full, clear, and exact description.

My invention relates generally to pulleys, and more particularly to that class of pulley where leather is used as a facing.

The principal object of my invention has been to provide a pulley for either frictional or belt transmission which shall give the maximum traction with a minimum tension and wear on the bearings. Another object has been to provide a pulley of this class wherein the useful life of the pulley shall be prolonged, and one which shall not break down when placed under sudden load.

The above objects and advantages have been accomplished by the device shown in the accompanying drawings. In these drawings, which form a part of this application, like characters of reference indicate like parts throughout the several views, of which:

Figure 1:
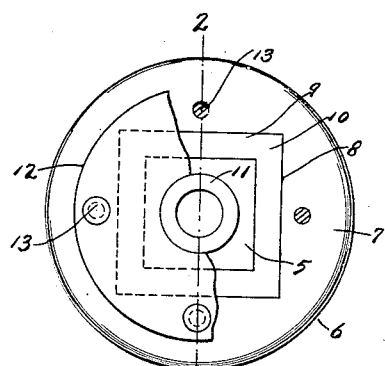
Figure 1 is a front elevation of my pulley, showing a portion of the end flange broken away.
Figure 2:
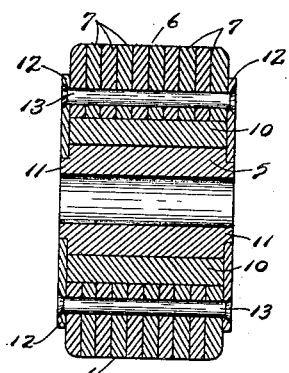
Fig. 2 is a sectional elevation of the same, taken on line 2—2 of Fig. 1.

Referring to Figs. 1 and 2, 5 represents the hub of my pulley which may be made either of metal or wood. This hub has preferably a square periphery so that relative rotation between the parts will be prevented. Disposed about the hub 5 is the leather facing 6 of my pulley, which is of laminated construction and formed by laminæ 7, preferably of leather. Formed through the central part of the laminæ 7 is a square aperture 8, preferably of larger size than the hub 5, thus leaving a space 9 therebetween. In this space 9 is preferably placed a ring 10 of wood pulp or other suitable material. This ring is placed in the pulley so as to reduce the amount of leather used. Such material is cheaper than leather, which reduces the cost of manufacturing the pulley.

The laminæ 7 are cemented on their contacting surfaces, and when being assembled are forced over the ring 10 and the hub 5, and are firmly pressed together. At each end of the hub 5 is arranged a reduced peripheral portion 11, and disposed on each is a flange 12. These flanges bear against the ring 10 and laminæ 7, and passing through the flanges and the laminæ 7 are a series of rods 13. These rods are riveted over, or secured in any other way, so as to press the parts of the pulley together and hold the entire structure in position.

It will be clearly seen that in my pulley the rotation of the hub within the pulley is positively prevented. In the form shown in Figs. 1 and 2, the laminæ are securely held together by the flanges 12 and rods 13 so that by no possible means can the square hub thereof rotate within the laminated periphery of the pulley.

Obviously, some modification of the details herein shown and described may be made without departing from the spirit of my invention or the scope of the appended claims, and I do not wish to be limited to the exact embodiment herein shown and described.

Having thus described my invention, what I claim is:

1. A pulley comprising a hollow hub, a facing composed of a series of leather laminæ arranged with their contacting surfaces at right angles to the axis of said hub and adhesively united along said surfaces, the central part of said laminæ being provided with a square-shaped aperture of larger size than said hub, a filler between said hub and the aperture through the laminæ, an end flange for each side of the pulley, having a less diameter than the face of the pulley, and rods passing through the end flanges and said laminæ for securing the same together.

2. A pulley comprising a hollow hub, a facing composed of a series of leather laminæ arranged with their contacting surfaces at right angles to the axis of said hub and adhesively united along said surfaces, said laminæ having square-shaped apertures of larger size than the hub, a ring of wood pulp disposed between said hub and said laminæ, an end flange for each side of the pulley, having a less diameter than the face of the pulley, and rods passing through the end flanges and said laminæ for securing the same together.

In testimony whereof, I have hereunto signed my name in the presence of two subscribing witnesses.

ALBERT E. FINCH.

Witnesses:
J. WM. ELLIS,
WALTER H. KELLEY.

Copies of this patent may be obtained for five cents each, by addressing the "Commissioner of Patents, Washington, D. C."